2,700,435
Patented Jan. 25, 1955

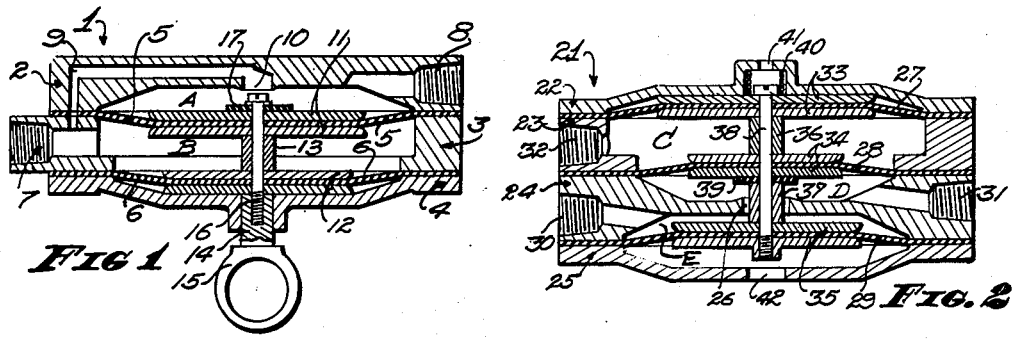
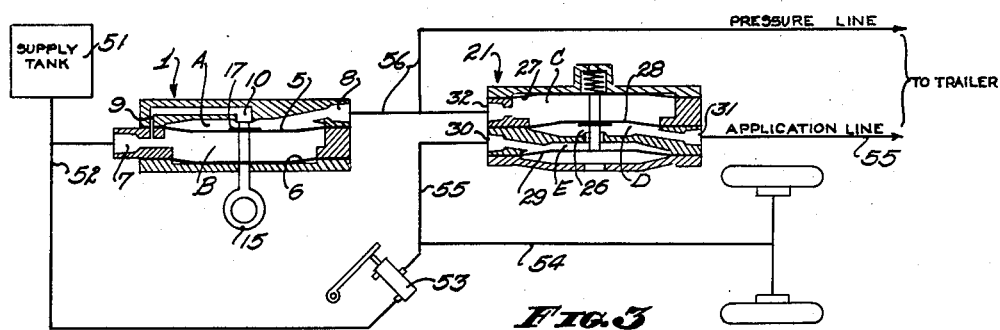
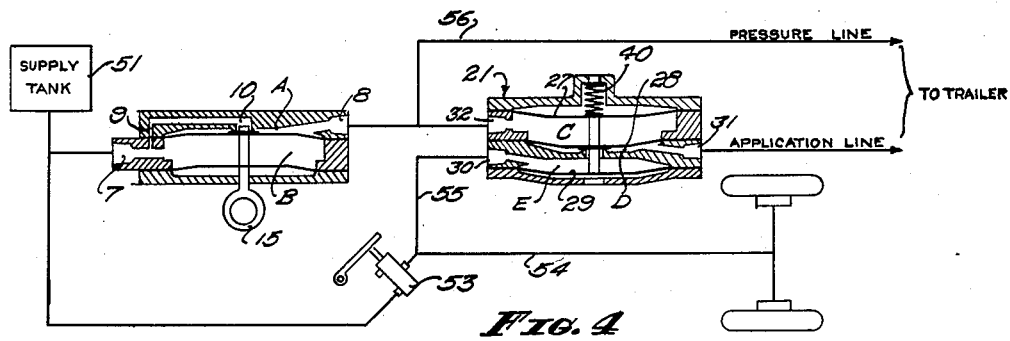
INVENTOR.
HOMER T. SEALE
BY Lyon & Lyon
ATTORNEYS

2,700,435
TRAILER LINE CONTROL APPARATUS
Homer T. Seale, Los Angeles, Calif.

Application August 4, 1952, Serial No. 302,591

14 Claims. (Cl. 188—3)

My invention relates to trailer line control apparatus for tractor-trailer air brake systems, and included in the objects of my invention are:

First, to provide a trailer line control apparatus for a tractor-trailer air brake system which is so arranged that in the event of a break in the pressure maintenance line or both the pressure maintenance line and brake application line between a tractor unit and a trailer unit, the air supply to the trailer is automatically shut off to prevent loss of air pressure with which to operate the brakes of the tractor unit.

Second, to provide an apparatus of this class which does not interfere in any manner with the operation of the air brake system or with the supply of air to the trailer for storage or brake application purposes.

Third, to provide in an apparatus of this class a first special valve so arranged as to operate automatically to shut off the pressure line to a trailer and cause operation of a companion valve to effect closure of the application line to the trailer, said valve being so arranged that, once operated, it must be manually re-opened.

Fourth, to provide in an apparatus of this class a second special valve so arranged as to be responsive to pressure in the pressure maintenance line to a trailer and under the condition of pressure in said line to maintain the brake application line to a trailer open for flow in either direction as the brakes are applied and released, said valve being arranged on loss of pressure in the pressure line to close against flow toward the trailer brakes but permit bleeding of pressure from the trailer brakes so that they are not locked in an energized condition, said valve also so arranged as to return to its normal operative position upon restoration of pressure in said pressure maintenance line.

With the above and other objects in view as may appear hereinafter, reference is directed to the accompanying drawing, in which:

Figure 1 is a transverse sectional view of one of the special valves employed in my trailer line control apparatus.

Figure 2 is a similar transverse sectional view of the other special valve employed in my apparatus.

Figure 3 is a diagrammatical view showing the arrangement of the valves when the apparatus is in its normal condition, that is, with the pressure line and application line to the trailer intact.

Figure 4 is a similar diagrammatical view showing the valves as they appear after failure of the pressure line or pressure line and application line, that is, under conditions in which the connections between the tractor and trailer are open.

Reference is first directed to Figure 1 which illustrates a first valve structure 1. The valve structure comprises three sectional valve members 2, 3 and 4 which may be circular, in plan and joined together at their peripheries by bolts, not shown.

Interposed between the body members are major and minor area diaphragms 5 and 6. The body members 2 and 4 form enclosures of the valve structure, whereas the body member 3 is in the form of a ring. The body member 2 is provided with a cavity which confronts the diaphragm 5 and forms therewith a valve chamber A. The two diaphragms 5 and 6 form therebetween a pressure chamber B. The diaphragm 6 is slightly smaller in area than the diaphragm 5 so that under conditions of pressure in chamber B, unopposed by pressure in chamber A, the diaphragms tend to move in the direction to reduce the volume of the valve chamber A.

The body member 3 is provided with a pressure line intake port 7, communicating with chamber B, and the body member 2 is provided with a pressure line outlet port 8 communicating with chamber A. A constricted passage 9 leads from the intake port 7 through the valve body 2 to the central portion of the valve chamber 9 and there forms a valve port 10.

The diaphragms 5 and 6 may be provided with clamp plates 11 and 12, respectively. Within the chamber B, the clamp plates are held in fixed relation by a spacer 13. A stem 14 extends through a guide aperture provided in the body member 4 and terminates in a pull handle 15. The clamp plates, spacer and stem may be secured together by a screw 16 which also serves to hold a valve washer 17 on the clamp plate which confronts the port 10. Operation of the first valve structure 1 will be described hereinafter.

Reference is now directed to Figure 2. The second valve structure 21, here illustrated, comprises a series of sectional valve body members 22, 23, 24 and 25. The valve body members 22 and 25 form the ends of the valve structure and are in the form of disks, whereas the intermediate body member 23 is in the form of a ring. The intermediate body member 24 is provided with a central web or wall of reduced thickness having a central valve port 26.

The several body members are secured at the peripheries by bolts, not shown. The body members clamp therebetween a major, minor and intermediate area diaphragms 27, 28 and 29. The major and minor area diaphragms 27 and 28 which are located on opposite sides of the valve body member 23 define a pressure chamber C. The diaphragm 28 forms with the adjacent side of the valve body member 24 an outlet chamber D, and the diaphragm 29 forms with the opposite side of the body member 24 an inlet chamber E.

The body member 24 is provided with an application line supply port 30 communicating with chamber E, and an application line return port 31 communicating with chamber D. The body member 23 is also provided with a pressure line port 32 communicating with chamber C.

The diaphragms 27, 28 and 29 are provided with pairs of clamp plates 33, 34 and 35, and are separated by spacers 36 and 37 so that the diaphragms move in unison. The assembly of clamp plates and spacers are secured by a tie bolt 38.

Interposed between the spacer 37, adjacent clamp plate 34, carried by the diaphragm 28, is a valve washer 39 which coacts with the valve port 26. A spring 40 is interposed between one of the clamp plates 33 and the end body member 22. The end body members are provided with atmosphere ports 41 and 42 so that the corresponding sides of the diaphragms 27 and 29 are exposed to atmospheric pressure. It will be observed that the intermediate diaphragm 28 has the smallest area, the diaphragm 29 is next in area, whereas diaphragm 27 has the largest area.

Operation of my trailer line control apparatus is as follows, reference being directed to Figures 3 and 4:

In Figure 3, the valve structures 1 and 21 are shown in their normal or operating condition, more specifically, air pressure maintained in a supply tank 51 is supplied through a line 52 to the pressure line intake port 7 of the first valve 1. The supply line 52 also communicates with the brake application valve 53 in the form of a 3-way valve arranged to deliver air from the line 52 to a tractor brake application line 54 and trailer brake application line 55 or to bleed pressure from these lines to atmosphere.

The second valve structure is interposed in the trailer brake application line 55, being connected therein by its ports 30 and 31 so that air passing in this line flows through chambers E, port 26 and chamber D. Air from the supply line 52 is directed through the constricted passage 9, valve port 10 and outlet ports 8 to a pressure line 56, leading to the trailer and having a "blind" branch, communicating with port 32 and chamber C of the second valve structure.

In Figure 3, the valves are shown in the positions which they assume when pressure exists in the pressure line 56. As long as this line is not losing pressure at a rate sufficient to create a pressure differential, between the port 7 and chamber A of the first valve structure, the valve port 10 remains open for the reason that the diaphragm 5 is larger in area than the diaphragm 6. However, the actual force required to move the diaphragms is determined by the difference in area of these two diaphragms.

Under these conditions of pressure in the pressure line 56. pressure is maintained in chamber C which causes port 26 to remain open due to the fact that diaphragm 27 is larger in area than diaphragm 28. Under these conditions, pressure in the application line 55, may vary from zero to a pressure equal to that maintained in line 56 without causing the port 26 to close.

Due to the fact that diaphragm 29 is less in area than diaphragm 27, it will be observed that flow may occur in either direction. In the event that pressure should drop excessively in the pressure line 56, for example, should the pressure line to the trailer be broken, a pressure diffrential is established between port 7 and chamber A of the first valve structure. That is, a reduced pressure occurs in chamber A, causing the diaphragm to move in a direction to close the port 10 as shown in Figure 4. Once closed, this port remains closed until the handle ring 15 is manually pulled outward.

On loss of pressure in line 56, the pressure exerted in line 55 is applied in chamber E against the diaphragm 29 to cause the port 26 to close, preventing loss from this line and enabling the brakes of the tractor to be operated through line 54. In the event that the application line to the trailer is still intact and pressure exists in that portion of the line between the second valve structure and the trailer brakes, this pressure may be bled backward through the second valve structure and through the brake application valve 53 so as to prevent the trailer brakes from being locked in an energized condition. On restoration of pressure in the pressure line 56, the second valve structure automatically returns to the condition shown in Figure 3. That is, no manual resetting of the second valve structure is required, permitting its placement anywhere on the tractor unit that may be convenient.

It is desirable that the first valve structure be arranged for manual resetting. In effect, the one operation of resetting the first valve structure resets both valve structures.

Having fully described my invention, it is to be understood that I do not wish to be limited to the details herein set forth, but my invention is of the full scope of the appended claims.

I claim:

1. In a tractor-trailer air brake system having a source of air pressure carried by the tractor, a pressure maintenance line connected with the trailer and a brake application line also connected with the trailer, the combination of: a first valve structure having a restricted flow passage interposed between said source of air pressure and said pressure maintenance line, a valve means interposed in said flow passage, means responsive to a predetermined pressure differential between said source of air pressure and pressure maintenance line to close said valve means and manually operable means to reopen said valve means; a second valve structure having a passageway interposed between said pressure source and said brake application line, a valve means interposed in said passageway, means tending to close said valve means of the second valve structure, and means communicating with said pressure maintenance line and, subject to the valve means of said first valve structure remaining open, arranged to maintain said valve means of the second valve structure open in response to pressure in said pressure maintenance line to permit flow in either direction in said brake application line.

2. In a tractor-trailer air brake system having a source of air pressure carried by the tractor, a pressure maintenance line connected with the trailer and a brake application line also connected with the trailer, the combination of: a first valve structure including body members and a pair of diaphragm members defining a primary and secondary chamber, the primary chamber being defined between one of said diaphragms and a body member, the secondary chamber being defined between both of said diaphragm members and another of said body members; a port communicating with said source of air pressure and with both of said chambers, there being interposed between said port and said primary chamber a constricted flow passage and valve means for controlling flow therefrom into said primary chamber and said pressure maintenance line, said valve means including a valve element carried by the diaphragm of said primary chamber, said diaphragms being of different areas and arranged to maintain said valve element open as long as the pressure in said primary chamber is substantially equal to or above the pressure in said secondary chamber, said valve element adapted when closed to remain closed until opened by an external force, and means for reopening said valve element; a second valve structure having a passageway interposed between said pressure source and said brake application line, a valve means interposed in said passageway, means tending to close said valve means of the second valve structure, and means communicating with said pressure maintenance line and, subject to the valve means of said first valve structure remaining open, arranged to maintain said valve means of the second valve structure open in response to pressure in said pressure maintenance line to permit flow in either direction in said brake application line.

3. In a tractor-trailer air brake system having a source of air pressure carried by the tractor, a pressure maintenance line connected with the trailer and a brake application line also connected with the trailer, the combination of: a first valve structure including body members and a pair of diaphragm members defining a primary and secondary chamber, the primary chamber being defined between one of said diaphragms and a body member, the secondary chamber being defined between both of said diaphragm members and another of said body members; a port communicating with said source of air pressure and with both of said chambers, there being interposed between said port and said primary chamber a constricted flow passage and valve means for controlling flow therefrom into said primary chamber, said valve means including a valve element carried by the diaphragm of said primary chamber, a port communicating between said primary chamber and said pressure maintenance line, said diaphragms being of different areas and arranged to maintain said valve element open as long as the pressure in said primary chamber is substantially equal to or above the pressure in said secondary chamber, said valve element adapted when closed to remain closed until opened by an external force, and means for reopening said valve element; a second valve structure, including body members and a set of diaphragms, said diaphragms being joined together for movement in unison, one of said body members and a pair of said diaphragms defining a pressure chamber communicating with said pressure maintenance line and dependent on pressure supplied through the valve means of said first valve structure, another pair of said diaphragms and a body member interposed therebetween defining inlet and outlet chambers separated by a valve port, a valve element carried by one of said diaphragms for coaction with said valve port, said inlet and outlet chambers being interposed in said brake application line, said diaphragms being of such relative areas that when pressure in said pressure chamber equals or is greater than pressure in said inlet and outlet chambers, said valve element is maintained open for flow in either direction through said brake application line, and upon loss of pressure in said pressure chamber to close said valve element to prevent flow to said brake application line; said second valve structure being adapted to reopen automatically on restoration of pressure in said pressure chamber.

4. In a tractor-trailer air brake system having a source of air pressure carried by the tractor and a pressure maintenance line connected with the trailer, the combination of: a valve structure including body members and a pair of diaphragm members defining a primary and secondary chamber, the primary chamber being defined between one of said diaphragms and a body member, the secondary chamber being defined between both of said diaphragm members and another of said body members; a port communicating with said source of air pressure and with both of said chambers, there being interposed between said port and said primary chamber a constricted flow passage and valve means for controlling flow therefrom into said primary chamber, said valve means including a valve element carried by the diaphragm of said primary chamber, a port communicating between said primary chamber and said pressure maintenance line, said diaphragms being of different areas and arranged to maintain said valve element open as long as the pressure in said primary chamber is substantially equal to or above the pressure in said secondary chamber, said valve element being adapted when closed to remain closed until opened by an external force, and means for applying an external force to open said valve element.

5. In a tractor-trailer air brake system having a source of air pressure carried by the tractor, a pressure maintenance line connected with the trailer and a brake application line also connected with the trailer, the combination of: a valve structure including body members and a set of diaphragms, said diaphragms being joined together for movement in unison, one of said body members and a pair of said diaphragms defining a pressure chamber communicating with said pressure maintenance line, another pair of said diaphragms and a body member interposed therebetween defining inlet and outlet chambers separated by a valve port, a valve element carried by one of said diaphragms for coaction with said valve port, said inlet and outlet chambers being interposed in said brake application line, said diaphragms being of such relative areas that when pressure in said pressure chamber equals or is greater than pressure in said inlet and outlet chambers, said valve element is maintained open for flow in either direction through said brake application line, and, upon loss of pressure in said pressure chamber, to close said valve element, said valve element being adapted to reopen automatically on restoration of pressure in said pressure chamber.

6. In a tractor-trailer air brake system having a source of air pressure carried by the tractor, a pressure maintenance line connected with the trailer and a brake application line also connected with the trailer, the combination of: a first valve structure including a major and minor diaphragm, joined together in spaced relation for movement in unison, a valve body structure defining with the space between said diaphragms a pressure chamber and defining with said major diaphragm a valve chamber, an inlet port connected with said source of air pressure and communicating with both said pressure chamber and valve chamber, an outlet port connected with said pressure maintenance line and communicating with said valve chamber, there being a restriction between said inlet port and valve chamber and a valve means between said constriction and valve chamber to seal said valve chamber and outlet port from said source of air pressure, said valve means including a valve element carried by said major diaphragm, said major diaphragm being responsive to a pressure differential between said valve chamber and pressure chamber to close said inlet port and thereupon subject to pressure in said pressure chamber to maintain said inlet port closed until reopened by an external force, and means for moving said diaphragms to open said inlet port; a second valve structure having a flow passage interposed between said pressure source and said brake application line, a valve means interposed in said flow passage and means communicating with said pressure maintenance line arranged to maintain said valve means open in response to pressure in said pressure maintenance line to permit flow in either direction in said brake application line.

7. In a tractor-trailer air brake system having a source of air pressure carried by the tractor, a pressure maintenance line connected with the trailer and a brake application line also connected with the trailer, the combination of: a first valve structure including a major and minor diaphragm, joined together in spaced relation for movement in unison, a valve body structure defining with the space between said diaphragms a pressure chamber and defining with said major diaphragm a valve chamber, an inlet port connected with said source of air pressure and communicating with both said pressure chamber and valve chamber, an outlet port connected with said pressure maintenance line and communicating with said valve chamber, there being a restriction between said inlet port and valve chamber and a valve means between said constriction and valve chamber to seal said valve chamber and outlet port from said source of air pressure, said valve means including a valve element carried by said major diaphragm, said major diaphragm being responsive to a pressure differential between said valve chamber and pressure chamber to close said inlet port and thereupon subject to pressure in said pressure chamber to maintain said inlet port closed until reopened by an external force, and means for moving said diaphragms to open said inlet port; a second valve structure including diaphragms of major, minor and intermediate areas joined together for movement in unison, a body structure defining with said major and minor diaphragms a pressure chamber in communication with said pressure maintenance line and including a ported wall between said minor and intermediate diaphragms to define therewith inlet and outlet chambers, said inlet and outlet chambers being interposed in said brake application line, a valve element carried by said minor diaphragm for sealing engagement with the port in said wall to isolate said inlet from said outlet chamber, said major diaphragm being operative to maintain said port open against the forces exerted by the other diaphragms as long as the pressure in said pressure maintenance line is maintained above a predetermined minimum with respect to the maximum pressure in said brake application line, and to close when pressure in said pressure maintenance line drops below said minimum; said valve element being responsive to reestablishment of pressure in said pressure maintenance line occasioned by resetting of said first valve structure to reopen communication through said brake application line.

8. In a tractor-trailer air brake system having a source of pressure carried by the tractor and a pressure maintenance line connected with the trailer, the combination of: a valve structure including a major and minor diaphragm, joined together in spaced relation for movement in unison, a valve body structure defining with the space between said diaphragms a pressure chamber, and defining with said major diaphragm a valve chamber, an inlet port connected with said source of air pressure and communicating with both said pressure chamber and valve chamber and outlet port connected with said pressure maintenance line and communicating with said valve chamber, there being a restriction between said inlet port and valve chamber and a valve means between said constriction and said valve chamber to seal said valve chamber and outlet port from said source of air pressure, said valve means including a valve element carried by said major diaphragm, said major diaphragm being responsive to a pressure differential between said valve chamber and pressure chamber to close said inlet port and thereupon subject to pressure in said pressure chamber to maintain said inlet port closed until reopened by an external force, and means for moving said diaphragms to open said inlet port.

9. In a tractor-trailer air brake system having a source of air pressure carried by the tractor, a pressure maintenance line connected with the trailer and a brake application line also connected with the trailer, the combination of: a valve structure including diaphragms of major, minor and intermediate areas joined together for movement in unison, a body structure defining with said major and minor diaphragms a pressure chamber in communication with said pressure maintenance line, and including a ported wall between said minor and intermediate diaphragms to define therewith inlet and outlet chambers, said inlet and outlet chambers being interposed in said brake application line, a valve element carried by said minor diaphragm for sealing engagement with the port in said wall to isolate said inlet from said outlet chamber, said major diaphragm being operative to maintain said port open against the forces exerted by the other diaphragms as long as the pressure in said pressure maintenance line is maintained above a predetermined minimum with respect to the maximum pressure in said brake application line.

10. In a fluid pressure control system having a source of fluid pressure, a pressure maintenance line and a pressure application line, the combination of: a first valve structure having a restricted flow passage interposed between said source of fluid pressure and said pressure maintenance line, a valve means interposed in said flow passage, means responsive to a predetermined pressure differential between said source of fluid pressure and pressure maintenance line to close said valve means, and means to reopen said valve means; a second valve structure having a passageway interposed between said pressure source and said pressure application line, a valve means interposed in said passageway and means communicating with said pressure maintenance line arranged to maintain said valve means open in response to pressure in said pressure maintenance line.

11. In a fluid pressure control system having a source of fluid pressure, a pressure maintenance line and a pressure application line, the combination of: a first valve structure including body members and a pair of diaphragm members defining a primary and secondary chamber, the primary chamber being defined between one of said diaphragms and a body member, the secondary chamber being defined between said diaphragm members and other of said body members; a port communicating with said source of fluid pressure and with both of said chambers, there being interposed between said port and said primary chamber a constricted flow passage and valve means for controlling flow therefrom into said primary chamber, said valve means including a valve element carried by the diaphragm of said primary chamber, a port communicating between said primary chamber and said pressure maintenance line, said diaphragms being of different areas and arranged to maintain said valve element open as long as the pressure in said primary chamber is substantially equal to or greater than the pressure in said secondary chamber, said valve element being adapted when closed to remain closed until reopened by an external force, and means for reopening said valve element; a second valve structure having a passageway interposed between said pressure source and said pressure application line, a valve means interposed in said passageway, means tending to close said valve means of the second valve structure, and means communicating with said pressure maintenance line arranged to maintain said valve means open in response to pressure in said pressure maintenance line.

12. In a fluid pressure control system having a source of fluid pressure, a pressure maintenance line and a pressure application line, the combination of: a first valve structure including body members and a pair of diaphragm members defining a primary and secondary chamber, the primary chamber being defined between one of said diaphragms and a body member, the secondary chamber being defined between said diaphragm members and other of said body members; a port communicating with said source of fluid pressure and with both of said chambers, there being interposed between said port and said primary chamber a constricted flow passage and valve means for controlling flow therefrom into said primary chamber, said valve means including a valve element carried by the diaphragm of said primary chamber, a port communicating between said primary chamber and said pressure maintenance line, said diaphragms being of different areas and arranged to maintain said valve element open as long as the pressure in said primary chamber is substantially equal or greater than the pressure in said secondary chamber, said valve element being adapted when closed to remain closed, and means for reopening said valve element; a second valve structure, including body members and a set of diaphragms, said diaphragms being joined together for movement in unison, one of said body members and a pair of said diaphragms defining a pressure chamber communicating with said pressure maintenance line, another pair of said diaphragms and a body member interposed therebetween defining inlet and outlet chambers separated by a valve port, a valve device carried by one of said diaphragms for coaction with said valve port, said inlet and outlet chambers being interposed in said pressure application line, said diaphragms being of such relative areas that when pressure in said pressure chamber equals or is greater than pressure in said inlet and outlet chambers, said valve device is maintained open for flow, said second valve structure being dependent on fluid pressure supply through said first valve structure to maintain said valve device open, and automatically responsive to reopening of said first valve structure to reopen said valve device.

13. In a fluid pressure control system having a source of fluid pressure and a pressure maintenance line, the combination of: a valve structure including body members and a pair of diaphragm members defining a primary and secondary chamber, the primary chamber being defined between one of said diaphragms and a body member, the secondary chamber being defined between said diaphragm members and other of said body members; a port communicating with said source of fluid pressure and with both of said chambers, there being interposed between said port and said primary chamber a constricted flow passage and valve means for controlling flow therefrom into said primary chamber, said valve means including a valve element carried by the diaphragm of said primary chamber, a port communicating between said primary chamber and said pressure maintenance line, said diaphragm members being of different areas and arranged to maintain said valve element open as long as the pressure in said primary chamber is substantially equal to or greater than the pressure in said secondary chamber, said valve element being adapted when closed to remain closed until reopened by an external force, and means for reopening said valve element.

14. In a fluid pressure control system having a source of fluid pressure, a pressure maintenance line and a pressure application line, the combination of: a valve structure including body members and a set of diaphragms, said diaphragms being joined together for movement in unison, one of said body members and a pair of said diaphragms defining a pressure chamber communicating with said pressure maintenance line, another pair of said diaphragms and a body member interposed therebetween defining inlet and outlet chambers separated by a valve port, a valve element carried by one of said diaphragms for coaction with said valve port, said inlet and outlet chambers being interposed in said pressure application line, said diaphragms being of such relative areas that when pressure in said pressure chamber equals or is greater than pressure in said inlet and outlet chambers, said valve element is maintained open for flow in either direction through said application line, and upon predetermined drop in pressure within said pressure chamber, said valve element closes to reopen automatically on restoration of pressure in said pressure chamber.

References Cited in the file of this patent

UNITED STATES PATENTS

| | | |
|---|---|---|
| 1,797,431 | Mathieson | Mar. 24, 1931 |
| 2,049,984 | Vorech et al. | Aug. 4, 1936 |
| 2,057,132 | Besler | Oct. 13, 1936 |
| 2,084,707 | Robinson | June 22, 1937 |
| 2,451,139 | Williams et al. | Oct. 12, 1948 |

FOREIGN PATENTS

| | | |
|---|---|---|
| 480,086 | Germany | July 27, 1929 |